(12) United States Patent
Lai et al.

(10) Patent No.: US 11,269,447 B2
(45) Date of Patent: Mar. 8, 2022

(54) TOUCH DISPLAY DEVICE AND CONTROL METHOD THEREOF

(71) Applicant: AU Optronics Corporation, Hsin-Chu (TW)

(72) Inventors: Chun-Chi Lai, Hsin-Chu (TW); Chia-Hsien Chu, Hsin-Chu (TW); Feng-Sheng Lin, Hsin-Chu (TW); Tsang-Hong Wang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/428,027

(22) Filed: May 31, 2019

(65) Prior Publication Data

US 2019/0369834 A1 Dec. 5, 2019

(30) Foreign Application Priority Data

May 31, 2018 (TW) .................................. 107119126

(51) Int. Cl.
*G06F 3/044* (2006.01)
*G06F 3/041* (2006.01)
*G09G 3/20* (2006.01)

(52) U.S. Cl.
CPC .......... *G06F 3/04166* (2019.05); *G06F 3/044* (2013.01); *G06F 3/0412* (2013.01); *G06F 3/04184* (2019.05); *G09G 3/20* (2013.01); *G09G 2310/0275* (2013.01); *G09G 2310/0297* (2013.01); *G09G 2354/00* (2013.01)

(58) Field of Classification Search
CPC ............. G06F 3/04166; G06F 3/04184; G06F 3/0412; G06F 3/044; G09G 3/20; G09G 2310/0275; G09G 2310/0297; G09G 2354/00
See application file for complete search history.

(56) References Cited

U.S. PATENT DOCUMENTS

| | | | |
|---|---|---|---|
| 9,310,942 B2* | 4/2016 | Park | G06F 3/044 |
| 2014/0225866 A1* | 8/2014 | Noguchi | G06F 3/0412 |
| | | | 345/174 |
| 2015/0091865 A1 | 4/2015 | Funayama | |
| 2015/0370410 A1 | 12/2015 | Sauer et al. | |

(Continued)

FOREIGN PATENT DOCUMENTS

| | | |
|---|---|---|
| CN | 103376961 A | 10/2013 |
| TW | 201514819 A | 4/2015 |
| TW | 201809989 A | 3/2018 |

*Primary Examiner* — Ram A Mistry
(74) *Attorney, Agent, or Firm* — WPAT, PC

(57) ABSTRACT

A touch display device includes a controller, a source driver, several multiplexers, and several touch sensors. The source driver is configured to output several data signals. The multiplexers are coupled to the controller and the source driver, and are configured to transmit the plurality of data signals to an active area according to at least one enable period of a multiplexing signal. The touch sensors are coupled to the controller, and are configured to receive a touch signal outputted from the controller. The touch signal includes a touch pulse. A touch pulse starting-time interval and a touch pulse ending-time interval of the touch pulse are located in at least one disable period of the multiplexing signal, and the touch pulse and the at least one enable period partially overlap in time sequence.

20 Claims, 5 Drawing Sheets

(56) References Cited

U.S. PATENT DOCUMENTS

| | | | |
|---|---|---|---|
| 2017/0024077 A1* | 1/2017 | Lin | G06F 3/0412 |
| 2017/0285859 A1 | 10/2017 | Shepelev et al. | |
| 2018/0059838 A1* | 3/2018 | Chung | G06F 3/0412 |
| 2019/0140024 A1* | 5/2019 | Yang | G06F 3/0416 |
| 2019/0265858 A1* | 8/2019 | Nishio | G09G 3/3648 |

\* cited by examiner

TOUCH DISPLAY DEVICE AND CONTROL METHOD THEREOF

CROSS-REFERENCE TO RELATED APPLICATION

This application claims the priority benefit of TAIWAN Application serial no. 107119126, filed May 31, 2018, the full disclosure of which is incorporated herein by reference.

FIELD OF INVENTION

The invention relates to a touch display device and a control method thereof. More particularly, the invention relates to a touch display device with multiplexers and the control method thereof.

BACKGROUND

With the advancement of the process technology, the touch display panel integrates the touch panel and the display panel, so that the user may directly instruct the electronic device to perform the required operations through the touch panel. Generally, the touch detection units and the pixel units on the touch display panel are arranged in a matrix on a two-dimensional plane, and according to the pulse signal, the timing of updating the display screen and the timing of detecting the touch point are determined.

Although the touch display panel integrating the touch panel and the display panel is full of functions, there is a serious problem: as the components on the touch display panel and the conductive lines are arranged more and more closely, the interference between the electric signals is getting worse.

SUMMARY

An embodiment of this disclosure is to provide a touch display device. The touch display device includes a controller, a source driver, several multiplexers, and several touch sensors. The source driver is configured to output several data signals. The multiplexers are coupled to the controller and the source driver, and are configured to transmit the plurality of data signals to an active area according to at least one enable period of a multiplexing signal. The touch sensors are coupled to the controller, and are configured to receive a touch signal outputted from the controller. The touch signal includes a touch pulse. A touch pulse starting-time interval and a touch pulse ending-time interval of the touch pulse is located in at least one disable period of the multiplexing signal, and the touch pulse and the at least one enable period partially overlap in time sequence.

An embodiment of this disclosure is to provide a control method. The control method is suitable for a touch display device. The control method includes the following operations: transmitting, by several multiplexers, several data signals to an active area to update the active area according to at least one enable period of a multiplexing signal; and operating, by several touch sensors, touch detection according to a touch pulse of a touch signal. A touch pulse starting-time interval and a touch pulse ending-time interval of the touch pulse are located in at least one disable period of the multiplexing signal, and the touch pulse and the at least one enable period are partially overlapped in time sequence.

Therefore, according to the technical concept of the present invention, embodiments of this disclosure are to provide a touch display device and a control method thereof, and in particular, a touch display device with multiplexers and the control method thereof. By locating the touch pulse starting-time interval and the touch pulse ending-time interval of the touch pulse within the at least one of the disable periods of the multiplexing signal, so as to decrease the signal interference between the touch signal and the display signal (including the multiplexing signal). Furthermore, in the embodiments of the present disclosure, the touch signal may not be limited by the frame time and the horizontal line time, several touch signals may be detected continuously, and the band mura may not occur during the display of the touch display device.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
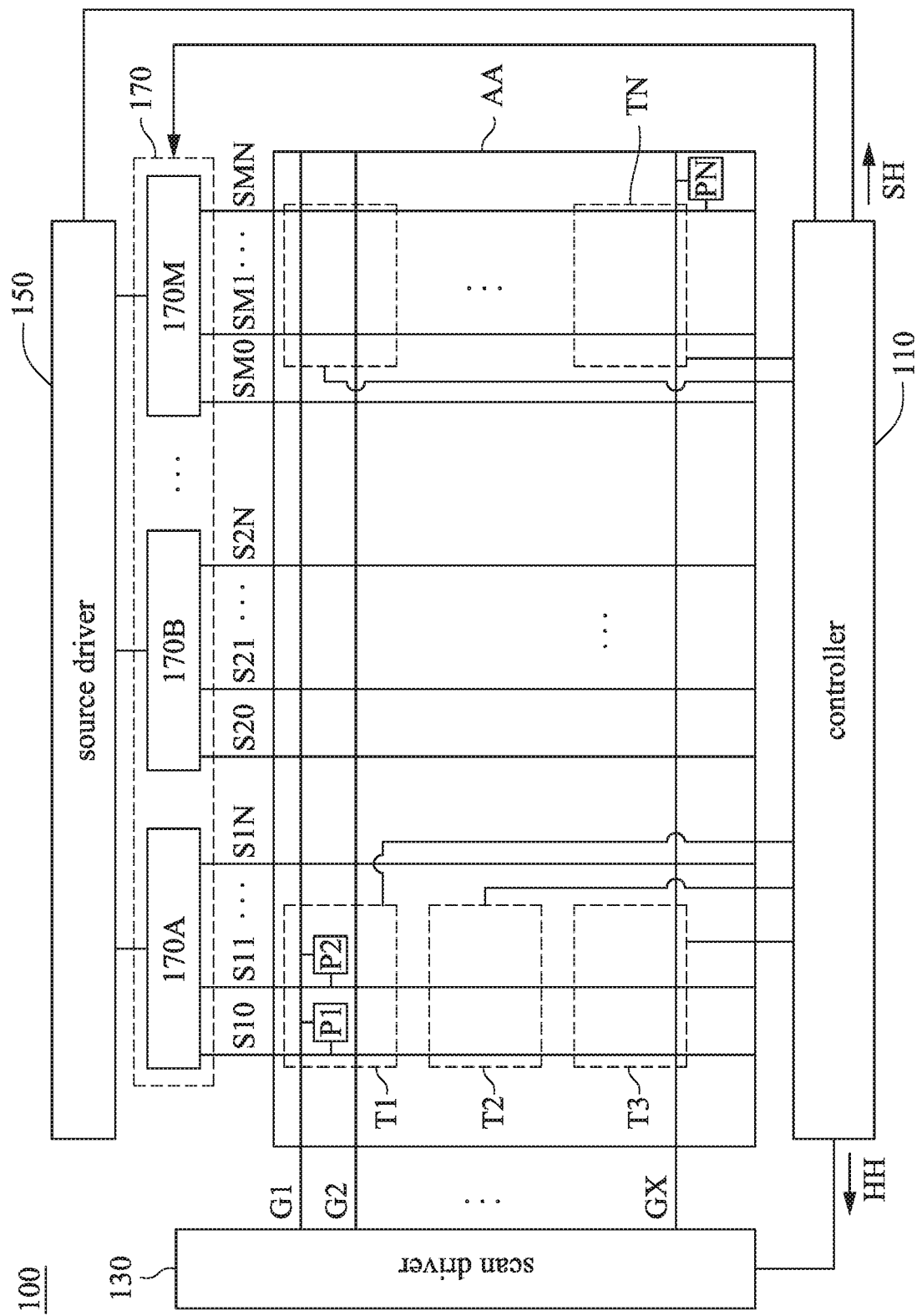
FIG. 1 is a schematic diagram illustrating a touch display device according to some embodiments of the present disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

Reference is made to FIG. 1. FIG. 1 is a schematic diagram illustrating a touch display device 100 according to some embodiments of the present disclosure. As illustrated in FIG. 1, the touch display device 100 includes a scan driver 130, a source driver 150, a controller 110, an active area AA, several multiplexers 170A to 170M, and several touch sensors T1 to TN.

The scan driver 130 outputs scan signals to the scanning lines G1 to GX. The source driver 150 outputs data signals to data lines S10 to SMN through several multiplexers 170 (including multiplexer 170A to multiplexer 170M). The active area AA includes several pixels P1 to PN formed by crossing the scanning lines G1 to GX and the data lines S10 to SMN. Each of the pixels P1 to PN couples to one of the scanning lines G1 to GX and one of the data lines S10 to SMN. The display of the active area AA changes in response to the scan signals outputted to the scanning lines G1 to GX and the data signals outputted to the data lines S10 to SMN. The display of the active area AA displays several frames in one second. When the data signals inputted to the plurality of pixels P1 to PN between two adjacent frames are changed, the display of the active area AA also changes accordingly.

The multiplexers 170A to 170M are coupled to the controller 110 and the source driver 150. Each of the multiplexers 170A to 170M further couples to part of the data lines S10 to SMN. In detail, the multiplexer 170A couples to the data lines S10 to S1N, the multiplexer 170B couples to the data lines S21 to S2N, and so on. When the source driver 150 outputs data signals to data lines S10 to SMN through the multiplexers 170A to 170M, the multiplexers 170A to 170M control the multiplexers 170A to 170M so as to control the data signals, which are outputted from the source driver 150, to transmit or not to transmit to the active area AA are not.

The controller 110 transmits the horizontal sync signal SH to the source driver 150 so as to control the data lines S10 to SMN to transmit the timing sequence of the data signals. The controller 110 further transmits the vertical sync signal HH to the scan driver 130 so as to control the scanning lines G1 to GX to transmit the timing sequence of the scan signal.

The touch sensors T1 to TN couple to the controller 110 and are configured to operate touch detection according to the touch signals outputted from the controller 110. It should be noted that, the touch sensors T1 to TN as illustrated in FIG. 1 are for illustrative purposes only, and the touch sensors T1 to TN may be different shapes, ranges, sizes, etc.

Figure 2:
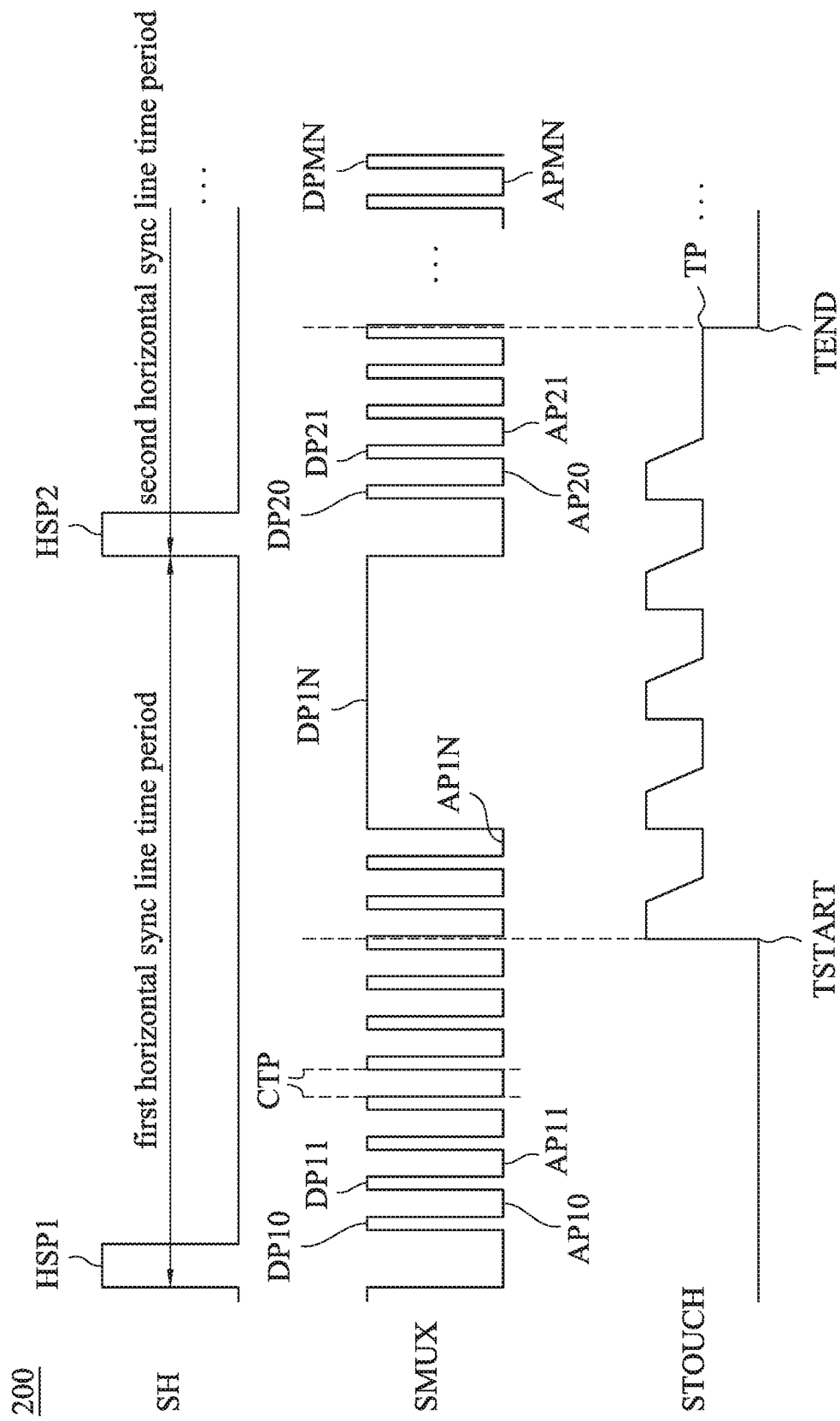
FIG. 2 is a diagram illustrating a control waveform of a touch display device according to some embodiments of the present disclosure.

Reference is made to FIG. 2. FIG. 2 is a diagram illustrating a control waveform 200 of a touch display device according to some embodiments of the present disclosure. In the control waveform 200 illustrated in FIG. 2, the horizontal sync signal SH is a signal transmitted from the controller 110 to the source driver 150, the multiplexing signal SMUX is a signal transmitted from the controller 110 to the multiplexers 170A to 170M, and the touch signal STOUCH is a signal transmitted from the controller 110 to the touch sensors T1 to TN.

As illustrated in FIG. 2, the horizontal sync signal SH includes several horizontal sync pulses HSP1, HSP2. From the occurrence time of the horizontal sync pulse HSP1 to the next occurrence time of the horizontal sync pulse HSP2 is called a horizontal sync line time period. Within the horizontal sync line time period, part of the pixels P1 to PN, which is connected to one of the scanning lines G1 to GX, receives the data signal through the multiplexers 170A to 170M, so as to operate updating. For example, assume that the horizontal sync signal SH includes a first horizontal sync line time period, a second horizontal sync line time period to the Nth horizontal sync line time period in sequential order. Within the first horizontal sync line time period, the pixels coupled to the scanning line G1 receive the data signal through the multiplexers 170A to 170M, so as to operate updating. Within the second horizontal sync line time period, the pixels coupled to the scanning line G2 receive the data signal through the multiplexers 170A to 170M, so as to operate updating, and so on.

Within each of the horizontal sync line time periods, the multiplexers 170A to 170M control the switches so as to transmit the data signal to the data lines S10 to SMN which are coupled to the multiplexers 170A to 170M in sequential order. For example, assume that each of the multiplexers 170A to 170M couple to ten data lines. Within a horizontal sync line time period, the multiplexer 170A controls the switches coupled to the multiplexer 170A so as to transmit the data signal to the data lines S10 to S19 in sequential order, and the multiplexer 170B controls the switches coupled to the multiplexer 170B so as to transmit the data signal to the data lines S20 to S29 in sequential order, and so one.

Assume when the voltage of the multiplexing signal SMUX is high represents the disable periods DP10 to DPMN of the multiplexers 170A to 170M, that is, during the disable period DP10 to DPMN, the data signals are not able to be transmitted to the pixels P1 to PN of the active area AA. Assume when the voltage of the multiplexing signal SMUX is low represent the enable periods AP10 to APMN of the multiplexers 170A to 170M, that is, during the enable periods AP10 to APMN, the data signals are able to be transmitted to the pixels P1 to PN of the active area AA. Take the case of each of the multiplexers 170A to 170M coupling to ten data lines for example, the multiplexers 170A to 170M include at least ten disable periods DP10 to DP1N and at least ten enable periods AP10 to AP1N within the first horizontal sync line time period, and the multiplexers 170A to 170M include at least ten disable periods DP20 to DP2N and at least ten enable periods AP20 to AP2N within the second horizontal sync line time period, and so on.

As illustrated in FIG. 2, the touch signal STOUCH includes a touch pulse TP, and the touch pulse TP includes a touch pulse starting-time interval TSTART and a touch pulse ending-time interval TEND. The touch pulse starting-time interval TSTART and the touch pulse ending-time interval TEND are located in the disable periods DP10 to DP1N of the multiplexing signal SMUX, and the touch pulse TP partially overlaps with at least one of the enable periods AP10 to APMN of the multiplexing signal SMUX in time sequence.

In some embodiments, as illustrated in FIG. 2, the multiplexing signal SMUX includes several electrical potential switching-time points CTP. The touch pulse starting-time interval TSTART and the touch pulse ending-time interval TEND are both staggered with the electrical potential switching-time points CTP.

In some embodiments, the touch pulse TP overlaps with at least one of the horizontal sync pulse HSP1, HSP2 in time sequence. As illustrated in FIG. 2, the touch pulse TP overlaps with the horizontal sync pulse HSP2 in time sequence. In some embodiments, the touch pulse TP overlaps with several horizontal sync pulses in time sequence.

Figure 3:
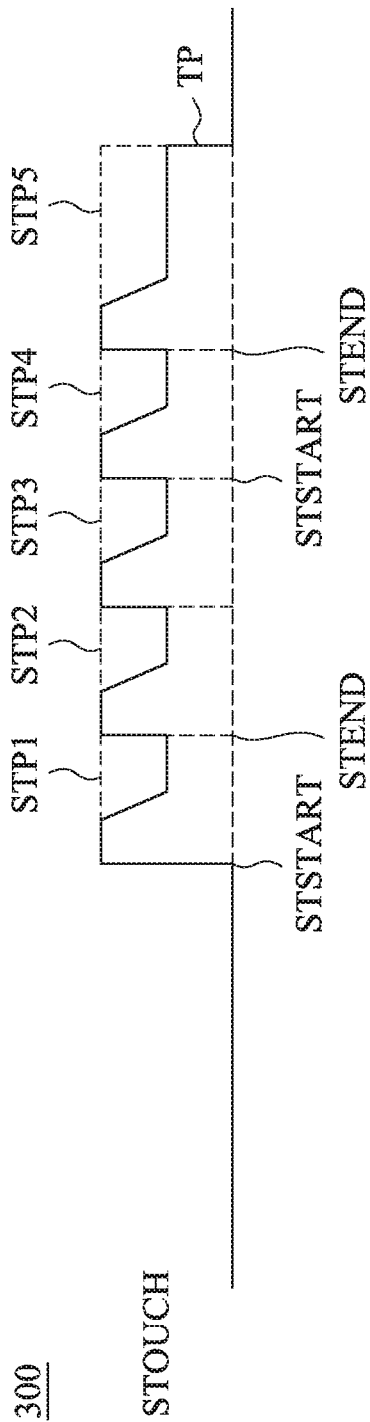
FIG. 3 is a diagram illustrating a touch signal waveform diagram according to some embodiments of the present disclosure.

Reference is made to FIG. 3. FIG. 3 is a diagram 300 illustrating a touch signal waveform diagram according to some embodiments of the present disclosure. In some embodiments, the touch pulse TP includes several sub-touch pulses STP1 to STP5, and each of the sub-touch pulse STP1 to STP5 includes a sub-touch pulse starting-time interval STSTART and a sub-touch pulse ending-time interval STEND. Both of the sub-touch pulse starting-time interval STSTART and the sub-touch pulse ending-time interval STEND are located in at least one of the disable periods DP10 to DPMN of the multiplexing signal SMUX as illustrated in FIG. 2.

Figure 4:
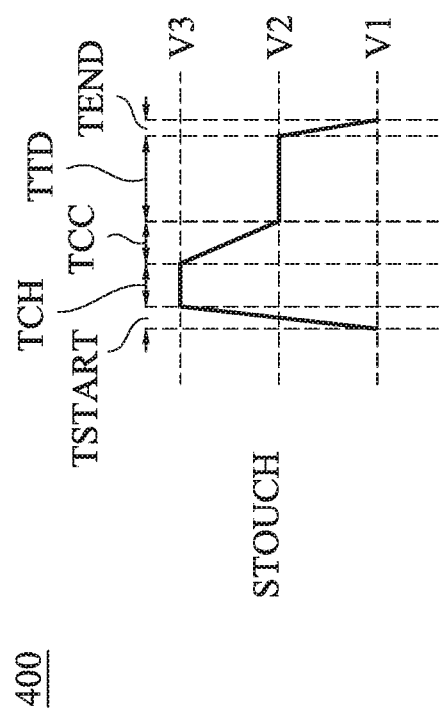
FIG. 4 is a diagram illustrating a touch signal waveform diagram according to some embodiments of the present disclosure.

Reference is made to FIG. 4. FIG. 4 is a diagram illustrating a touch signal waveform diagram 400 according to some embodiments of the present disclosure. As illustrated in FIG. 4, the touch signal STOUCH includes a touch pulse starting-time interval TSTART, a touch pulse voltage maintenance time interval TCH, a touch pulse capacitance compensating-time interval TCC, a touch pulse touch detection time interval TTD, and a touch pulse ending-time interval TEND.

Each of the touch sensors T1 to TN as illustrated in FIG. 1 includes a touch capacitance (not shown). Reference is made to FIG. 4, the touch pulse starting-time interval TSTART is the time interval that the touch capacitance charges from voltage V1 to voltage V3, the touch pulse voltage maintenance time interval TCH is the time interval that the voltage of the touch capacitance maintains at voltage V3, the touch pulse capacitance compensating-time interval TCC is the time interval that the voltage of the touch capacitance charging inversely from voltage V3 to voltage V2. The voltage V2 mentioning above is the voltage that the touch sensor T1 to TN may start to operate touch control. By this time, the capacitance value of the touch capacitance is the base value (base line). The touch pulse touch detection time interval TTD is the time interval that the touch sensors T1 to TN perform touch detection, and the touch pulse ending-time interval TEND is the time interval that the touch capacitance operates resetting, that is, the time interval that the voltage of the touch capacitance decreases from voltage V2 to voltage V1. Within the touch pulse ending-time interval TEND, the capacitance value of the touch capacitance is reset to the original value.

In some embodiments, the time length of the touch pulse starting-time interval TSTART and the time length of the touch pulse ending-time interval TEND are both smaller than half of one of the disable periods DP10 to DPMN. For example, assume that the touch pulse starting-time interval TSTART is located within the disable period DP11, the time length of the touch pulse starting-time interval TSTART is smaller than half of the time length of the disable period DP11. For another example, assume that the touch pulse ending-time interval TEND is located within the disable period DP21, the time length of the touch pulse ending-time interval TEND is smaller than half of the time length of the disable period DP21.

Figure 5:
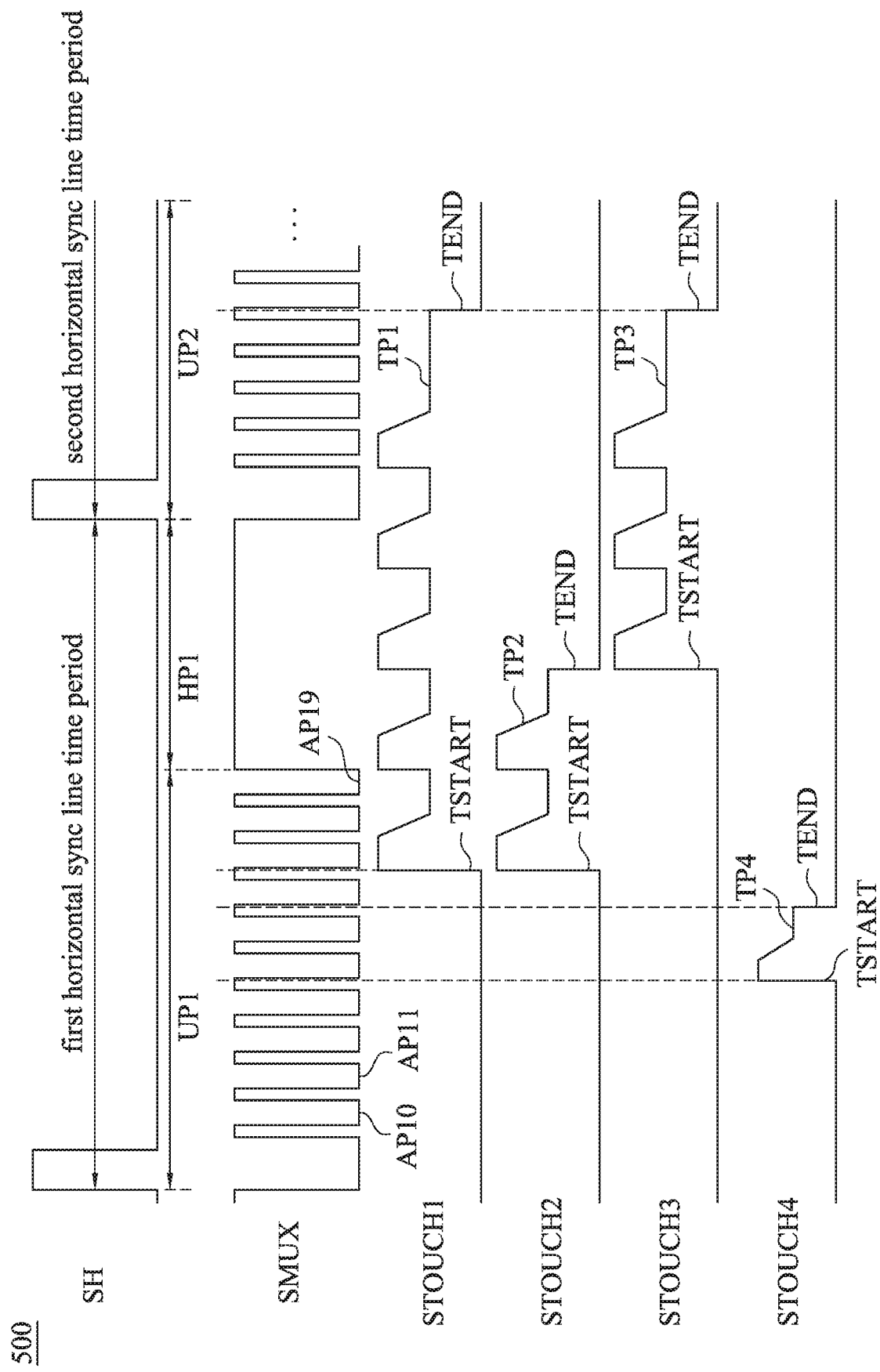
FIG. 5 is a diagram illustrating a control waveform diagram according to some embodiments of the present disclosure.

Reference is made to FIG. 5. FIG. 5 is a diagram illustrating a control waveform diagram 500 according to some embodiments of the present disclosure. As illustrated in FIG. 5, the multiplexing signal SMUX includes update periods UP1, UP2 and the maintenance period HP1. In detail, assume that each of the multiplexers 170A to 170M couples to ten data lines. Within the first horizontal sync line time period, the multiplexer 170A controls the ten data lines coupling to the multiplexer 170A to receive the data signals outputted from the source driver 150, as illustrated in FIG. 1, in sequential order. That is, within the first horizontal sync line time period, the multiplexer 170A receives ten multiplexer pulses, so that each of the ten data lines coupling to the multiplexer 170A receives the data signals, which are outputted from the source driver 150, in sequential order.

In detail, within the enable period AP10, the multiplexer 170A controls the data line S10 to receive the data signal, the multiplexer 170B controls the data line S20 to receive the data signal, and the rest of the multiplexers are so on and so forth. Within the enable period AP11, the multiplexer 170A controls the data line S11 to receive the data signal, the multiplexer 170B controls the data line S21 to receive the data signal, and the rest of the multiplexers are so on and so forth. Within the enable period AP19, the multiplexer 170A controls the data line S19 to receive the data signal, the multiplexer 170B controls the data line S29 to receive the data signal, and the rest of the multiplexers are so on and so forth.

After ten enable periods AP10 to AP19, the multiplexers 170A to 170M finishes one round of the multiplexer control, so that one of the scanning lines G1 to GX updates the part of the pixels P1 to PN, which is coupled to the one of the scanning lines G1 to GX.

As illustrated in FIG. 5, the first update period UP1 represents the time interval from the occurrence time of the first horizontal sync pulse HSP1 till the time point that the multiplexers 170A to 170 finish one round of the multiplexer control. The first maintenance period HP1 represents the time interval from the time point that the multiplexers 170A to 170M finish one round of the multiplexer control to the occurrence time of the next horizontal sync pulse HSP2. The second update period UP2 represents the occurrence time of the second horizontal sync pulse HSP2 to the time point that the multiplexers 170A to 170M finish next round of the multiplexer control.

FIG. 5 illustrates several touch signals STOUCH1 to STOUCH4. As illustrated in FIG. 5, the touch pulse starting-time interval TSTART of the touch pulse TP1 of the touch signal STOUCH1 is located within the first update period UP1, the touch pulse ending-time interval TEND of the touch pulse TP1 is located within the second update period UP2, and the touch pulse TP1 overlaps with the first maintenance period HP in time sequence.

The touch pulse starting-time interval TSTART of the touch pulse TP2 of the touch signal STOUCH2 is located within the first update period UP1, and the touch pulse ending-time interval TEND of the touch pulse TP2 is located within the first maintenance period HP1.

The touch pulse starting-time interval TSTART of the touch pulse TP3 of the touch signal STOUCH3 is located within the first maintenance period HP1, and the touch pulse ending-time interval TEND of the touch pulse TP2 is located within the update period UP2.

Both of the touch pulse starting-time interval TSTART and the touch pulse ending-time interval TEND of the touch pulse TP4 of the touch signal STOUCH4 are located within the first maintenance period HP1.

It should be noted that, the touch pulse TP1 may overlap with not only one of the maintenance periods, and the touch pulse TP1 may overlap with several maintenance periods in time sequence.

The touch pulse starting-time intervals TSTART and the touch pulse ending-time intervals TEND of the touch signals STOUCH1 to STOUCH4 as illustrated in FIG. 5 are located within at least one of the disable periods DP10 to DPMN of the multiplexing signal SMUX, and the touch pulse starting-time intervals TSTART and the touch pulse ending-time intervals TEND of the touch signals STOUCH1 to STOUCH4 are staggered with the electrical potential switching-time points CTP of the multiplexing signal SMUX as illustrated in FIG. 1.

In the embodiments of the present disclosure, as long as the touch pulse starting-time interval TSTART and the touch pulse ending-time interval TEND of the touch pulse TP are located within the at least one of the disable periods DP10 to DPMN of the multiplexing signal SMUX, the signal interference between the touch signal STOUCH and the display signal (including the multiplexing signal SMUX). That is, in the embodiments of the present disclosure, the touch pulse TP does not need to be limited within the maintenance period HP1 of the multiplexing signal SMUX, the touch pulse TP may also be located within the update periods UP1, UP2 of the multiplexing signal SMUX, or the touch pulse TP may also be overlapped with the update periods UP1, UP2 of the multiplexing signal SMUX in time sequence, so that the touch signal STOUCH may not be limited by the frame time and the horizontal line time.

Furthermore, in the embodiments of the present disclosure, the touch pulse TP includes several sub-touch pulses STP. That is, in the embodiments of the present disclosure, the touch sensors T1 to TN may detect several touch signals continuously.

Moreover, since in the embodiments of the present disclosure, the touch pulse starting-time interval TSTART and the touch pulse ending-time interval TEND of the touch pulse TP are staggered with the electrical potential switching-time points CTP of the multiplexing signal SMUX, the band mura may not occur during the display of the touch display device 100.

Figure 6:
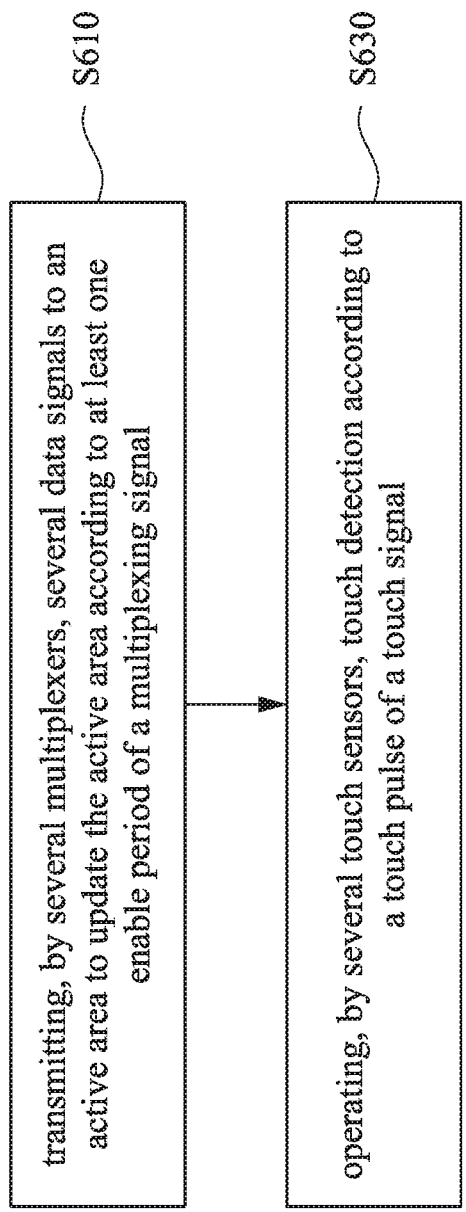
FIG. 6 is a flow chart illustrating a control method according to some embodiments of the present disclosure.

Reference is made to FIG. 6. FIG. 6 is a flow chart illustrating a control method 600 according to some embodiments of the present disclosure. As illustrated in FIG. 6, the control method 600 includes operations S610 to S630.

For the ease of explaining and understanding the control method 600, reference is made to FIG. 1.

In operation S610, transmitting, by several multiplexers, several data signals to an active area to update the active area according to at least one enable period of a multiplexing signal. In some embodiments, the operation S610 may be operated by the multiplexers 170A to 170M of FIG. 1.

For example, reference is made to FIG. 2. During the enable periods AP10 to APMN of the multiplexing signal SMUX, the multiplexers 170A to 170M in FIG. 1 transmit data signals to the active area AA in FIG. 1 to update the active area AA.

In operation S630, operating, by several touch sensors, touch detection according to a touch pulse of a touch signal. The touch pulse starting-time interval and the touch pulse ending-time interval of the touch pulse are located within at least one disable period of the multiplexing signal, and the touch pulse is partially overlapped with at least one enable period in time sequence. In some embodiments, the operation S630 may be operated by the touch sensors T1 to TN in FIG. 1.

For example, reference is also made to FIG. 2. The touch pulse starting-time interval TSTART and the touch pulse ending-time interval TEND of the touch pulse TP are located within at least one of the disable periods DP10 to DPMN of the multiplexing signal SMUX, and the touch pulse TP partially overlaps with at least one of the enable periods AP10 to APMN in time sequence.

In some embodiments, the multiplexing signal SMUX includes several electrical potential switching-time points CTP, and the touch pulse starting-time interval TSTART and the touch pulse ending-time interval TEND are staggered with the electrical potential switching-time points CTP.

It may be known from the embodiments mentioning above, the embodiments of the present disclosure provides a touch display device and a control method thereof, particularly, a touch display device with multiplexers and a control method thereof, by locating the touch pulse starting-time interval TSTART and the touch pulse ending-time interval TEND of the touch pulse TP within the at least one of the disable periods DP10 to DPMN of the multiplexing signal SMUX, so as to decrease the signal interference between the touch signal STOUCH and the display signal (including the multiplexing signal SMUX). Furthermore, in the embodiments of the present disclosure, the touch signal STOUCH may not be limited by the frame time and the horizontal line time, several touch signals may be detected continuously, and the band mura may not occur during the display of the touch display device 100.

In this document, the term "coupled" may also be termed as "electrically coupled", and the term "connected" may be termed as "electrically connected". "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one unit from another. For example, a first unit could be termed a second element, and, similarly, a second unit could be termed a first element, without departing from the scope of the embodiments. As used herein, the term "and/or" includes any and all combinations of one or more of the associated listed items.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A touch display device, comprising:
   a controller providing a touch signal;
   a source driver configured to output a plurality of data signals;
   a plurality of multiplexers coupled to the controller and the source driver, and configured to transmit the plurality of data signals to an active area according to a plurality of enable periods of a multiplexing signal, wherein the multiplexing signal comprises the plurality of enable periods and a plurality of disable periods; and
   a plurality of touch sensors coupled to the controller, and configured to receive the touch signal outputted from the controller, wherein the touch signal comprises a touch pulse, and the touch pulse comprises a touch pulse starting-time interval and a touch pulse ending-time interval;
   wherein a plurality of horizontal sync signals is configured to synchronize outputting the plurality of data signals, and each of the plurality of horizontal sync signals indicates starting an update period, wherein the plurality of data signals are transmitted during the update period; and wherein a first part of the plurality of enable periods, a first part of the plurality of disable periods, and at least one of the touch pulse starting-time interval and the touch pulse ending-time interval are located in a first update period indicated by one of the plurality of horizontal sync signals;

wherein the first update period represents a first time interval from a first occurrence time of a first horizontal sync pulse of the plurality of horizontal sync signals till a first time point that the plurality of multiplexers finish a first round of a multiplexer control, and a first maintenance period represents a second time interval from the first time point to a second occurrence time of a second horizontal sync pulse of the plurality of horizontal sync signals, wherein the first update period includes the first part of the plurality of enable periods, and the first maintenance period includes no enable period;

wherein during the first round of the multiplexer control, the plurality of multiplexers transmit a first part of the plurality of data signals to the active area during the first part of the plurality of enable periods;

wherein the first time point is located at a last voltage changing edge of a last enable period of the first part of the plurality of enable periods;

wherein the first time point is located between the first horizontal sync pulse and the second horizontal sync pulse, wherein the first horizontal sync pulse and the second horizontal sync pulse are two consecutive horizontal sync pulses, and the first horizontal sync pulse occurs before the second horizontal sync pulse;

wherein a second time point is located at a first voltage changing edge of a first enable period of the first part of the plurality of enable periods, and the at least one of the touch pulse starting-time interval and the touch pulse ending-time interval is located between the second time point and the first time point, wherein the second time point occurs before the first time point.

2. The touch display device of claim 1, wherein the controller is configured to transmit the plurality of horizontal sync signals to the source driver, the plurality of horizontal sync signals comprise a plurality of horizontal sync pulses, and the touch pulse and the plurality of horizontal sync pulses overlap in time sequence.

3. The touch display device of claim 1, wherein the touch pulse comprises a plurality of sub-touch pulses, the plurality of sub-touch pulses comprise a plurality of sub-touch pulse starting-time intervals and a plurality of sub-touch pulse ending-time intervals, and the plurality of sub-touch pulse starting-time intervals and the plurality of sub-touch pulse ending-time intervals are located in the plurality of disable periods.

4. The touch display device of claim 1, wherein the multiplexing signal comprises a plurality of electrical potential switching-time points, and the touch pulse starting-time interval and the touch pulse ending-time interval are all staggered with the plurality of electrical potential switching-time points.

5. The touch display device of claim 1, wherein a length of the touch pulse starting-time interval and a length of the touch pulse ending-time interval are both smaller than half of a first disable period of the plurality of disable periods.

6. The touch display device of claim 1, wherein the touch pulse further comprises at least one capacitance compensating-time interval, and the plurality of touch sensors operate touch detection after the at least one capacitance compensating-time interval.

7. The touch display device of claim 1, wherein the multiplexing signal comprises the first update period, and the touch pulse starting-time interval and the touch pulse ending-time interval are located in the first update period.

8. The touch display device of claim 1, wherein the multiplexing signal comprises the first update period and the first maintenance period in sequential order, and the touch pulse starting-time interval is located in the first update period, and the touch pulse ending-time interval is located in the first maintenance period.

9. The touch display device of claim 1, wherein the multiplexing signal comprises the first update period, the first maintenance period and a second update period in sequential order, wherein the touch pulse starting-time interval is located in the first update period, the touch pulse ending-time interval is located in the second update period, and the touch pulse overlaps with the first maintenance period in time sequence.

10. The touch display device of claim 1, wherein the multiplexing signal comprises the first maintenance period and the first update period in sequential order, wherein the touch pulse starting-time interval is located in the first maintenance period, and the touch pulse ending-time interval is located in the first update period.

11. A control method, suitable for a touch display device, comprising:
providing, by a controller, a touch signal;
outputting, by a source driver, a plurality of data signals;
transmitting, by a plurality of multiplexers, the plurality of data signals to an active area to update the active area according to a plurality of enable periods of a multiplexing signal, wherein the multiplexing signal comprises the plurality of enable periods and a plurality of disable periods;
receiving, by the controller, the touch signal outputted from the controller, wherein the touch signal comprises a touch pulse, and the touch pulse comprises a touch pulse starting-time interval and a touch pulse ending-time interval;
operating, by a plurality of touch sensors, touch detection according to the touch pulse of a touch signal;
wherein a plurality of horizontal sync signals is configured to synchronize outputting the plurality of data signals, and each of the plurality of horizontal sync signals indicates starting an update period, wherein the plurality of data signals are transmitted during the update period; and
wherein a first part of the plurality of enable periods, the first part of the plurality of disable periods, and at least one of the touch pulse starting-time interval and the touch pulse ending-time interval are located in a first update period indicated by one of the plurality of horizontal sync signals;
wherein the first update period represents a first time interval from a first occurrence time of a first horizontal sync pulse of the plurality of horizontal sync signals till a first time point that the plurality of multiplexers finish a first round of a multiplexer control, and a first maintenance period represents a second time interval from the first time point to a second occurrence time of a second horizontal sync pulse of the plurality of horizontal sync signals, wherein the first update period includes the at least one enable period, and the first maintenance period includes no enable period;
wherein during the first round of the multiplexer control, the plurality of multiplexers transmit a first part of the plurality of data signals to the active area during the first part of the plurality of enable periods;

wherein the first time point is located at a last voltage changing edge of a last enable period of the first part of the plurality of enable periods;

wherein the first time point is located between the first horizontal sync pulse and the second horizontal sync pulse, wherein the first horizontal sync pulse and the second horizontal sync pulse are two consecutive horizontal sync pulses, and the first horizontal sync pulse occurs before the second horizontal sync pulse;

wherein a second time point is located at a first voltage changing edge of a first enable period of the first part of the plurality of enable periods, and the at least one of the touch pulse starting-time interval and the touch pulse ending-time interval is located between the second time point and the first time point, wherein the second time point occurs before the first time point.

12. A touch display device, comprising:

a controller providing a touch signal;

a source driver configured to output a plurality of data signals;

a plurality of multiplexers coupled to the controller and the source driver, and configured to transmit the plurality of data signals to an active area according to a plurality of enable periods of a multiplexing signal, wherein the multiplexing signal comprises a plurality of enable periods and a plurality of disable periods; and a plurality of touch sensors coupled to the controller, and configured to receive the touch signal outputted from the controller, wherein the touch signal comprises a touch pulse, and the touch pulse comprises a touch pulse starting-time interval and a touch pulse ending-time interval;

wherein a plurality of horizontal sync signals is configured to synchronize outputting the plurality of data signals, and each of the plurality of horizontal sync signals indicates starting an update period, wherein the plurality of data signals are transmitted during the update period; and wherein a first part of the plurality of enable periods, a first part of the plurality of disable periods, and at least one of the touch pulse starting-time interval and the touch pulse ending-time interval are located in a first update period indicated by one of the plurality of horizontal sync signals;

wherein the first update period represents a first time interval from a first occurrence time of a first horizontal sync pulse of the plurality of horizontal sync signals till a first time point that the plurality of multiplexers finish a first round of a multiplexer control, and a first maintenance period represents a second time interval from the first time point to a second occurrence time of a second horizontal sync pulse of the plurality of horizontal sync signals, wherein the first update period includes the at least one enable period, and the first maintenance period includes no enable period;

wherein during the first round of the multiplexer control, the plurality of multiplexers transmit a first part of the plurality of data signals to the active area during the first part of the plurality of enable periods;

wherein the first time point is located at an ending edge of a last enable period of the first part of the plurality of enable periods.

13. The touch display device of claim 12, wherein the controller is configured to transmit the plurality of horizontal sync signals to the source driver, the plurality of horizontal sync signals comprise a plurality of horizontal sync pulses, and the touch pulse and the plurality of horizontal sync pulses overlap in time sequence.

14. The touch display device of claim 12, wherein the touch pulse comprises a plurality of sub-touch pulses, the plurality of sub-touch pulses comprise a plurality of sub-touch pulse starting-time intervals and a plurality of sub-touch pulse ending-time intervals, and the plurality of sub-touch pulse starting-time intervals and the plurality of sub-touch pulse ending-time intervals are located in the plurality of disable periods.

15. The touch display device of claim 12, wherein the multiplexing signal comprises a plurality of electrical potential switching-time points, and the touch pulse starting-time interval and the touch pulse ending-time interval are all staggered with the plurality of electrical potential switching-time points.

16. The touch display device of claim 12, wherein a length of the touch pulse starting-time interval and a length of the touch pulse ending-time interval are both smaller than half of a first disable period of the plurality of disable periods.

17. The touch display device of claim 12, wherein the touch pulse further comprises at least one capacitance compensating-time interval, and the plurality of touch sensors operate touch detection after the at least one capacitance compensating-time interval.

18. The touch display device of claim 12, wherein the multiplexing signal comprises the first update period, and the touch pulse starting-time interval and the touch pulse ending-time interval are located in the first update period.

19. The touch display device of claim 12, wherein the multiplexing signal comprises the first update period and the first maintenance period in sequential order, and the touch pulse starting-time interval is located in the first update period, and the touch pulse ending-time interval is located in the first maintenance period.

20. The touch display device of claim 12, wherein the multiplexing signal comprises the first update period, the first maintenance period and a second update period in sequential order, wherein the touch pulse starting-time interval is located in the first update period, the touch pulse ending-time interval is located in the second update period, and the touch pulse overlaps with the first maintenance period in time sequence.

* * * * *